United States Patent Office 2,798,542
Patented July 9, 1957

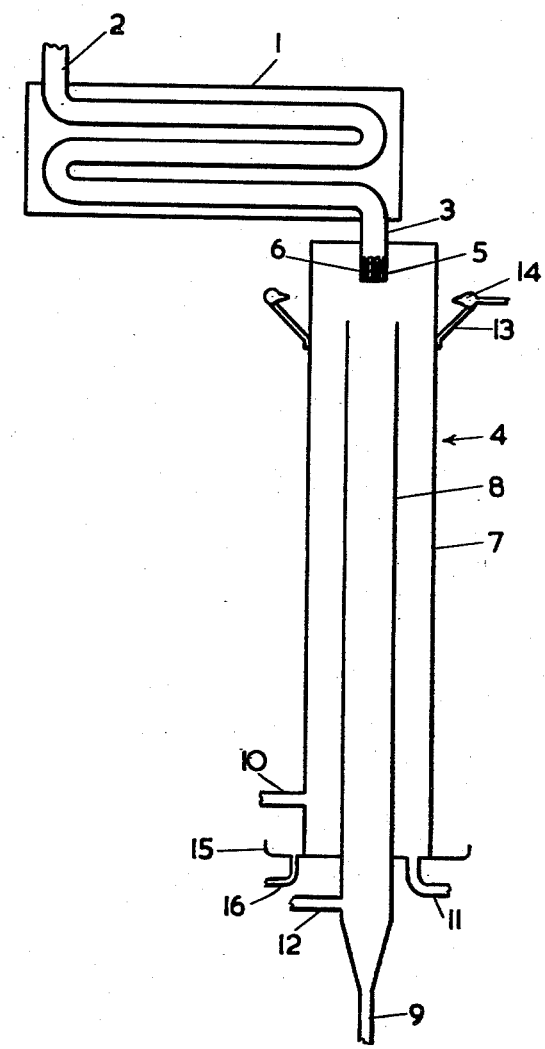

2,798,542
CONCENTRATION OF VISCOUS SOLUTIONS

James Gordon Napier Drewitt, John Alec John, and Gordon Ernest Smith, Spondon, near Derby, England, assignors to British Celanese Limited, a corporation of Great Britain Application September 16, 1952, Serial No. 309,814

Claims priority, application Great Britain October 1, 1951

10 Claims. (Cl. 159—4)

This invention relates to methods of concentrating viscous solutions of high molecular substances in volatile solvents.

Solutions of this kind are used on a very large scale in the production of artificial filaments and other textile articles by dry and wet spinning methods. At the present time solutions of cellulose acetate in acetone are among the most important of these spinning solutions, and in describing the invention we shall refer to them particularly. The invention may, however, also be applied to the concentration of acetone solutions of vinyl chloride/vinyl acetate copolymers, aqueous nitromethane solutions of polyacrylonitrile and other acrylonitrile polymers, and other solutions of high molecular compounds in solvents which are volatile in the sense of boiling at temperatures substantially below the softening or decomposition temperature of the solute.

According to the invention, viscous solutions of high molecular substances in volatile solvents are concentrated by forming the solutions into liquid filaments or films by extrusion, and immediately evaporating solvent from the filaments or films by means of heat which is already in the solution before it is extruded, without causing solidification or phase-reversal. Preferably the process is carried out under conditions such that the atmosphere surrounding the filaments or films immediately after their extrusion contains a high proportion, advantageously above 75% or 80% and especially above 90% by volume, of the vapour of the solvent.

In the preferred method of putting the invention into practice, the solution to be concentrated is heated, under a pressure sufficient to keep it liquid, to a temperature above the normal boiling point of the solvent in the solution, and while still at such a temperature is extruded in the form of filaments or films into an evaporation zone in which a pressure is maintained which causes part of the solvent to evaporate from the extruded solution without the supply of further heat, while avoiding solidification and phase-reversal in the solution. It is usually advantageous to extrude the hot solution into an evaporation zone in which the pressure is about or somewhat below atmospheric. Preferably also a slow stream of air or other gas is passed through the evaporation zone to carry away the vaporised solvent, while the solution collects in or is withdrawn from the bottom of the evaporation zone. The velocity of the gas stream is preferably so related to the rate of extrusion and the other conditions that the resulting atmosphere in the immediate vicinity of the point of extrusion contains 75% or more, and especially above 90%, by volume of solvent vapour. If too rapid a gas stream is used, so that the concentration of solvent vapour is comparatively low, a skin may be formed on the filaments or films and the resulting more concentrated solution may not then be homogeneous.

When the heated solution is extruded as a filament or filaments, the diameter of the filaments is preferably less than 2 mm. and especially about 0.1–1 mm.; a diameter of 0.3–0.8 mm. is very satisfactory. Similarly, if the solution is extruded as a film or films, the thickness of the films is preferably less than 2 mm. and especially from 0.1–1 mm. It has been found that by adhering to these dimensions and to the concentrations of solvent vapour in the evaporative atmosphere specified above, it is possible to obtain concentrated solutions which are as homogeneous and free from gels as the more dilute solutions from which they are obtained, without making any provision for stirring or otherwise homogenising them.

The temperature to which the solution is heated will, of course, depend upon the particular solvent present, as well as on the desired degree of concentration and the conditions in the evaporation zone. By way of example, 25–30% acetone solutions of cellulose acetate heated to 110°–160° C. and extruded as filaments into an evaporation zone in which the pressure is in the neighbourhood of 760 mm. and in which the atmosphere in the immediate vicinity of the point of extrusion contains about 90–98% of acetone vapour, may be brought to a concentration of 35–48%.

If, as will usually be the case, it is required to keep constant the degree to which the solution is concentrated, it is important that the various operating conditions should be kept constant, namely the temperature to which the solution is heated, the rate of extrusion, the pressure in the evaporation zone and especially the rate at which the air stream is passed through the evaporation zone. Moreover, it is necessary to ensure that none of the evaporated solvent is condensed and returned to the solution while the solution is still in the evaporation zone.

The invention also comprises a form of device for carrying out the concentration, which has been found to be both simple and effective. The device comprises essentially two vertical tubes, preferably coaxial, one within the other so as to form an annular space between them, and communicating at their upper ends. Within or above the inner tube is a nozzle through which the solution to be concentrated is extruded in a downward direction into the tube. At the lower end of the inner tube is a receiver or lead-off for liquid, and a gas inlet is provided substantially below the upper end of the tube, and preferably near or at its lower end. The outer tube is provided with cooling means, and with a gas outlet and a receiver or lead-off for liquid separate from the receiver or lead-off of the inner tube.

The solution to be concentrated may be heated in any convenient way, for example in an autoclave or a tubular or other form of continuous heater through which it is fed under pressure, and is extruded through the nozzle in the form of one or more filaments into the inner tube, whereupon part of the solvent at once evaporates leaving a cooler, more concentrated solution. The concentrated solution collects in the receiver or is led off from the lower end of the tube. A slow stream of air or other gas is passed through both tubes, preferably by applying a degree of suction at the gas outlet in the outer tube. The vaporised solvent is carried by the air stream into and down the outer tube, where it is cooled and condensed. The air leaving the outer tube may be treated to recover residual solvent vapour, but it may often be convenient to recirculate it to the air inlet of the inner tube without attempting to remove solvent vapour from it. The rate of travel of the air stream and the rate at which the heated solution is extruded through the nozzle are so correlated as to maintain the desired proportion of solvent vapour in the atmosphere immediately below the jet face.

A particular form of device in accordance with the invention is illustrated diagrammatically and in section in the accompanying drawing.

The device comprises a continuous heater 1, capable of withstanding internal pressure, and provided with an inlet 2 and an outlet 3 for the solution to be concentrated. The outlet 3 extends downwardly into an evaporator 4 and at its lower end carries a nozzle 5 with a number of orifices 6.

The evaporator 4 comprises a vertical cylindrical shell 7, within which is mounted a coaxial cylindrical tube 8 opening at its upper end close to and vertically below the nozzle 5, and extending downwardly beyond the base of the shell 7, where it tapers to a liquid outlet 9 leading to a receiver (not shown). A gas outlet 10 leads from the shell 7 near its lower end, and in the base of the shell is a liquid outlet 11. A gas inlet 12 leads into the lower end of the tube 8 below the base of the shell. Near its upper end the shell carries on brackets 13 a sparge pipe 14 adapted to spray cold water onto its outer wall, and surrounding its lower end is a gutter 15 provided with a run off 16.

In operating the device, the solution to be concentrated is forced under pressure through the heater 1, in which it is raised to the desired temperature above the normal boiling point, and whence it passes to the nozzle 5, by means of which it is extruded in the form of filaments into the evaporator 4.

The shell 7 of the evaporator is cooled by irrigation with cold water by means of the sparge pipe 14, and a current of air is drawn through the evaporator from the gas inlet 12, up the tube 8 to the neighbourhood of the nozzle 5, and down the space between the shell 7 and the tube 8 to the outlet 10. As the filaments of solution leave the nozzle 5 and drop into the tube 8, part of their solvent content is rapidly vaporised, the vapour being carried by the air stream into the space between the shell 7 and tube 8 where it is cooled and for the most part condensed. The condensate leaves the evaporator by the outlet 11 in the base of the shell, and such solvent vapour as remains uncondensed is removed with the air stream through the outlet 10. The concentrated solution leaves the evaporator through the outlet 9.

Although in the device illustrated the evaporator is circular in cross-section, this is by no means essential; for example when the solution is extruded in the form of a film or a number of filaments in a single plane, the cross-sections of the shell and of the inner tube may be rectangular, and may have one dimension much longer than the other.

The invention is illustrated by the following example, in which the device particularly described above and illustrated in the drawing was used. The nozzle orifices were 0.6 mm. in diameter.

*Example*

The solution to be concentrated was a 28% (by weight) solution of cellulose acetate in acetone, and was heated in the heater 1 to 120° C., and extruded at this temperature. The pressure in the evaporator was approximately atmospheric, and the rate at which air was drawn through the evaporator was adjusted so as to maintain an acetone vapour concentration of about 95% by volume just below the nozzle. The concentration of the cellulose acetate solution leaving the evaporator was 45%, and this solution was homogeneous and free from gels. The shell 7 was cooled by cold water from the sparge pipe 14, and most of the vaporised acetone was condensed in the space between the shell 7 and the inner tube 8, the remainder being carried away with the air leaving the evaporator by the outlet 10.

Having described our invention, what we desire to secure by Letters Patent is:

1. Process for concentrating a viscous solution of a polymeric substance of high molecular weight in a volatile solvent, which comprises heating the solution to a temperature which is above its boiling point at atmospheric pressure and at which temperature the polymeric substance is thermally stable, the pressure under which the solution is heated being sufficient to keep it liquid, extruding the solution in a continuous unsupported stream having at least one transverse dimension less than 2 mm. into an evaporation zone containing an atmosphere having a temperature and pressure both lower than the temperature and pressure of the solution immediately before its extrusion, the pressure, temperature and solvent concentration of said atmosphere being equal to those of an atmosphere in equilibrium with a solution of the same polymeric substance in the same solvent and of concentration higher than that of the solution to be concentrated, continuously introducing a stream of gas into the said evaporation zone at a point remote from the point of extrusion and causing it to flow towards the point of extrusion, and in the course of such flow to meet the solution travelling from the point of extrusion whereby it takes up solvent vapor from the solution, and decreasing said gas flow when said vapor concentration falls and increasing said gas flow when said vapor concentration rises and thereby maintaining the solvent vapour content of the atmosphere in the vicinity of the point of extrusion above 75% by volume.

2. Process according to claim 1, wherein the solution is extruded in the form of filaments of diameter 0.1–1 mm.

3. Process for the concentration of a 25–30% acetone solution of cellulose acetate, which comprises heating the solution to a temperature of 110°–160° C. under a pressure sufficient to keep it liquid, extruding the heated solution in the form of filaments of diameter less than 2 mm. into an evaporation zone maintained at a substantially lower temperature and at a pressure at most atmospheric, continuously introducing a stream of air into the said evaporation zone at a point remote from the point of extrusion and causing it to flow towards the point of extrusion, and in the course of such flow to meet the solution travelling from the point of extrusion whereby it takes up acetone vapor from the solution, and decreasing said gas flow when said vapor concentration falls and increasing said gas flow when said vapor concentration rises and thereby maintaining the acetone vapour content of the atmosphere in the vicinity of the point of extrusion between 95 and 98% by volume.

4. A device suitable for concentrating viscous solutions of polymeric substances of high molecular weight in volatile solvents, which comprises an inner and an outer tube, vertically disposed one within the other, communicating with each other at their upper ends only, the inner tube being open at its upper end and the outer tube, which extends above the inner tube, being closed at its upper end, means in the upper part of the device for extruding a liquid downwardly into the inner tube in the form of continuous unsupported streams having at least one dimension less than 2 mm., a liquid outlet opening into the lower end of the inner tube, a gas inlet opening into the inner tube at a level remote from the extrusion means, a gas outlet opening into the lower part of the outer tube, means outside and operatively connected with the device for causing gas to enter the device through the said inlet and to leave it through the said outlet, means associated with the outer tube for cooling its outer wall, and a liquid outlet opening into the lower end of the outer tube.

5. A device according to claim 4, wherein the means for causing gas to enter and leave the device comprises suction means operatively connected with the gas outlet.

6. A device according to claim 4, comprising means for heating the solution to be concentrated communicating with the extrusion means.

7. Process for concentrating a viscous solution of cellulose acetate in acetone, which comprises heating the solution to a temperature which is above its boiling point at atmospheric pressure and at which temperature the cellulose acetate is thermally stable, the pressure at which the solution is heated being sufficient to keep it liquid, extruding the solution in a continuous unsupported stream having at least one transverse dimension less than 2 mm. into an evaporation zone containing an atmosphere having a temperature and pressure both lower than the temperature and pressure of the solution immediately before its extrusion, the pressure, temperature and solvent concentration of said atmosphere being equal to those of an atmosphere in equilibrium with a solution of cellulose acetate in acetone of concentration higher than that of the solution to be concentrated, continuously introducing a stream of air into said evaporation zone at a point remote from the point of extrusion and causing it to flow towards the point of extrusion, and in the course of such flow to meet the solution travelling from the point of extrusion whereby it takes up acetone vapor from the solution, and decreasing said gas flow when said vapor concentration falls and increasing said gas flow when said vapor concentration rises and thereby maintaining the acetone vapor content of the atmosphere in the vicinity of the point of extrusion above 75% by volume.

8. Process according to claim 7, wherein the acetone vapour content of the atmosphere in the vicinity of the point of extrusion is maintained above 90% by volume.

9. Process according to claim 8, wherein the solution is extruded in the form of filaments of diameter 0.1–1 mm.

10. Process according to claim 9, wherein the pressure in the evaporation zone is at most atmospheric pressure.

References Cited in the file of this patent

UNITED STATES PATENTS

| | | |
|---|---|---|
| 1,215,140 | Giller | Feb. 6, 1917 |
| 1,695,111 | Lahousse | Dec. 11, 1928 |
| 1,817,349 | Clark | Aug. 4, 1931 |
| 2,146,532 | Crane et al. | Feb. 7, 1939 |
| 2,317,479 | Peebles | Apr. 27, 1943 |
| 2,368,049 | Stratford | Jan. 23, 1945 |
| 2,572,321 | Deanesley | Oct. 23, 1951 |
| 2,604,154 | Henszey | July 22, 1952 |

FOREIGN PATENTS

| | | |
|---|---|---|
| 686,027 | France | July 21, 1930 |
| 531,359 | Great Britain | Jan. 2, 1941 |
| 61,192 | Netherlands | June 15, 1948 |